United States Patent [19]

Leutsch et al.

[11] Patent Number: 5,309,599
[45] Date of Patent: May 10, 1994

[54] WIPING DEVICE FOR WINDOWS OF POWER VEHICLES

[75] Inventors: Wolfgang Leutsch, Buehlertal; Axel Boeringer, Grossburgwedel, both of Fed. Rep. of Germany

[73] Assignee: Robert Bosch GmbH, Stuttgart, Fed. Rep. of Germany

[21] Appl. No.: 661,864

[22] Filed: Feb. 27, 1991

[30] Foreign Application Priority Data

Mar. 15, 1990 [DE] Fed. Rep. of Germany ........ 4008352

[51] Int. Cl.⁵ .............................................. B60S 1/32
[52] U.S. Cl. .................... 15/250.2; 15/250.35
[58] Field of Search ........................... 15/260.2, 250.35

[56] References Cited

U.S. PATENT DOCUMENTS

| 2,844,839 | 7/1958 | Krohm | 15/250.35 |
| 4,370,774 | 2/1983 | Bienert et al. | 15/250.2 |

FOREIGN PATENT DOCUMENTS

| 3600454 | 7/1986 | Fed. Rep. of Germany | 15/250.2 |
| 3643733 | 6/1988 | Fed. Rep. of Germany | 15/250.2 |
| 3743669 | 7/1988 | Fed. Rep. of Germany | 15/250.2 |
| 0160637 | 12/1980 | Japan | 15/250.2 |
| 0060751 | 5/1981 | Japan | 15/250.2 |
| 0194138 | 11/1982 | Japan | 15/250.2 |
| 0167349 | 9/1984 | Japan | 15/250.2 |
| 0135847 | 6/1986 | Japan | 15/250.2 |
| 2180442 | 4/1987 | United Kingdom | 15/250.2 |

Primary Examiner—Harvey C. Hornsby
Assistant Examiner—Gary K. Graham
Attorney, Agent, or Firm—Michael J. Striker

[57] ABSTRACT

A wiping device for windows of power vehicles comprises a wiper arm, and a unit for changing an abutment force of the wiper arm. The unit includes a wiper shaft, one part of the wiper arm being mounted in the wiper shaft while another part of the wiper arm being hingedly connected with the one part of the wiper arm, a wiping element arranged on a free end of the other part of the wiper arm, a pulling spring loading the wiper element toward a window of a power vehicle. A unit is provided for changing a pretensioning of the pulling spring and includes two hinge rods hingedly connected in their coupling point on an axle, while another end of a first one of the hinge rods is turnable about a fixed axle and another end of a second one of the hinge rods is displaceable by a force in direction to the fixed axle of the first hinge rod. The pulling spring has an end which is spaced from the wiping element and suspended on the axis of the coupling point.

2 Claims, 2 Drawing Sheets

WIPING DEVICE FOR WINDOWS OF POWER VEHICLES

BACKGROUND OF THE INVENTION

The present invention relates to a wiping device for windows of power vehicles.

Wiping arrangements are generally known and used for wiping windows of power vehicles. They are formed relatively simple and operate efficiently. However, for certain special cases, especially when very high air forces occur, they are not suitable.

SUMMARY OF THE INVENTION

Accordingly, it is an object of the present invention to provide wiping device for windows of power vehicles, which avoids the disadvantages of the prior art.

More particularly, it is an object of the present invention to provide a wiping device for windows of power vehicles, which is especially suitable for the use when high forces occur such as both air forces and actuating forces.

In keeping with these objects and with others which will become apparent hereinafter, one feature of the present invention resides, briefly stated, in a wiping device for windows of power vehicles including a device for changing a wiping arm abutting force, a swingingly driven wiping shaft, a wiping arm with a part of it mounted on the wiping shaft, a wiping element arranged on a free end of another part of the wiping arm and loaded with a pulling spring, wherein means for pretensioning of the pulling spring include two link rods which are articulately connected on an axle at their coupling point, while another end of the first link rod is turnable about a fixed axle, and another end of the second link rod is displaceable by a force in direction to the fixed axle of the first link rod, and the end of the pulling spring which is remote from the wiper is suspended on the axle of the movable coupling point.

When the wiping device is designed in accordance with the present invention, it eliminates the disadvantages of the prior art and achieves the objects specified hereinabove. Such a wiping device is suitable for the use when high forces occur, especially both air forces and actuating forces.

In accordance with another feature of the present invention, a linear drive is provided for producing the adjustment force for the link rod system, especially an electric motor with spindle and a spindle nut, a hydraulic cylinder-piston unit, or a pneumatic cylinder-piston unit.

Still a further feature of the present invention is that in the device the fixed axle of a link rod is located substantially under the axle for the wiper arm, and the link rods extend in opposite direction as compared with the wiper arm.

The novel features which are considered as characteristic for the invention are set forth in particular in the appended claims. The invention itself, however, both as to its construction and its method of operation, together with additional objects and advantages thereof, will bebest understood from the following description of specific embodiments when read in connection with the accompanying drawings.

DESCRIPTION OF A PREFERRED EMBODIMENT

Figure 1:
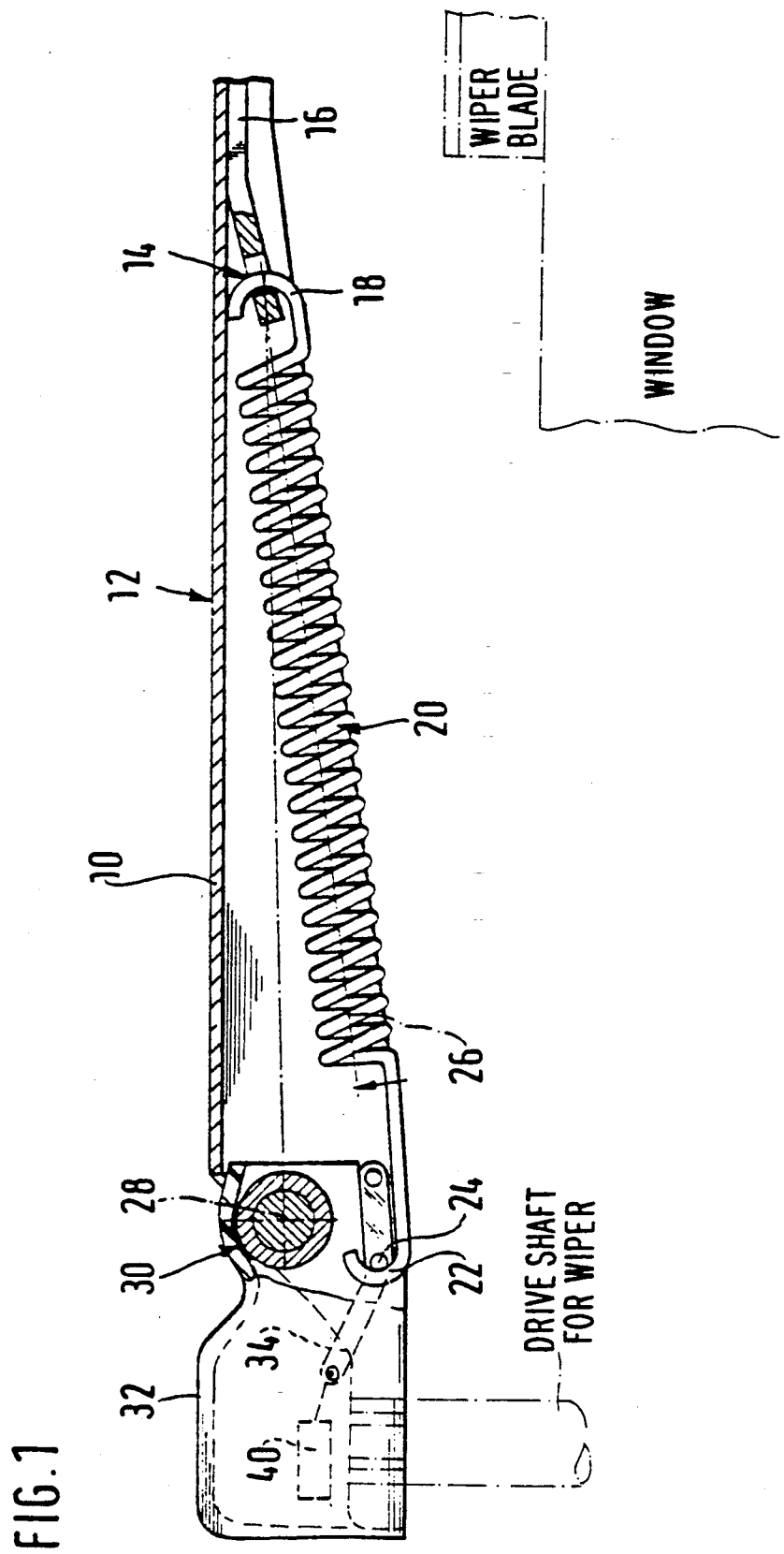
FIG. 1 is a view showing a part of a wiping device for windows of power vehicles in accordance with the present invention.

A wiping device for windows of power vehicles is shown in the drawings. In FIG. 1 a web part is identified with reference numeral 10 and forms a part of a wiper arm 12. A mounting point is identified on the web part 10 with reference numeral 14 and is associated with an ear member 16 provided with an opening. One end 18 of a pulling spring 20 is suspended in the opening. The pulling spring 20 provides a predetermined pressing force for the window wiper against the window of the vehicle. The other end 22 of the spring 20 is suspended on an axle 24 of a coupling point which is shown in detail in FIG. 2. The longitudinal axis of the pulling spring 20 is identified with reference numeral 26.

The wiper arm 12 is turnable about an axle 28, on which a hinge 30 is arranged. The hinge 30 is located in a synthetic plastic housing 32 which also forms a part of the wiper arm 12 and is mounted on a wiper shaft. The housing 32 is not shown in detail since it is not germain for the present invention.

Figure 2:
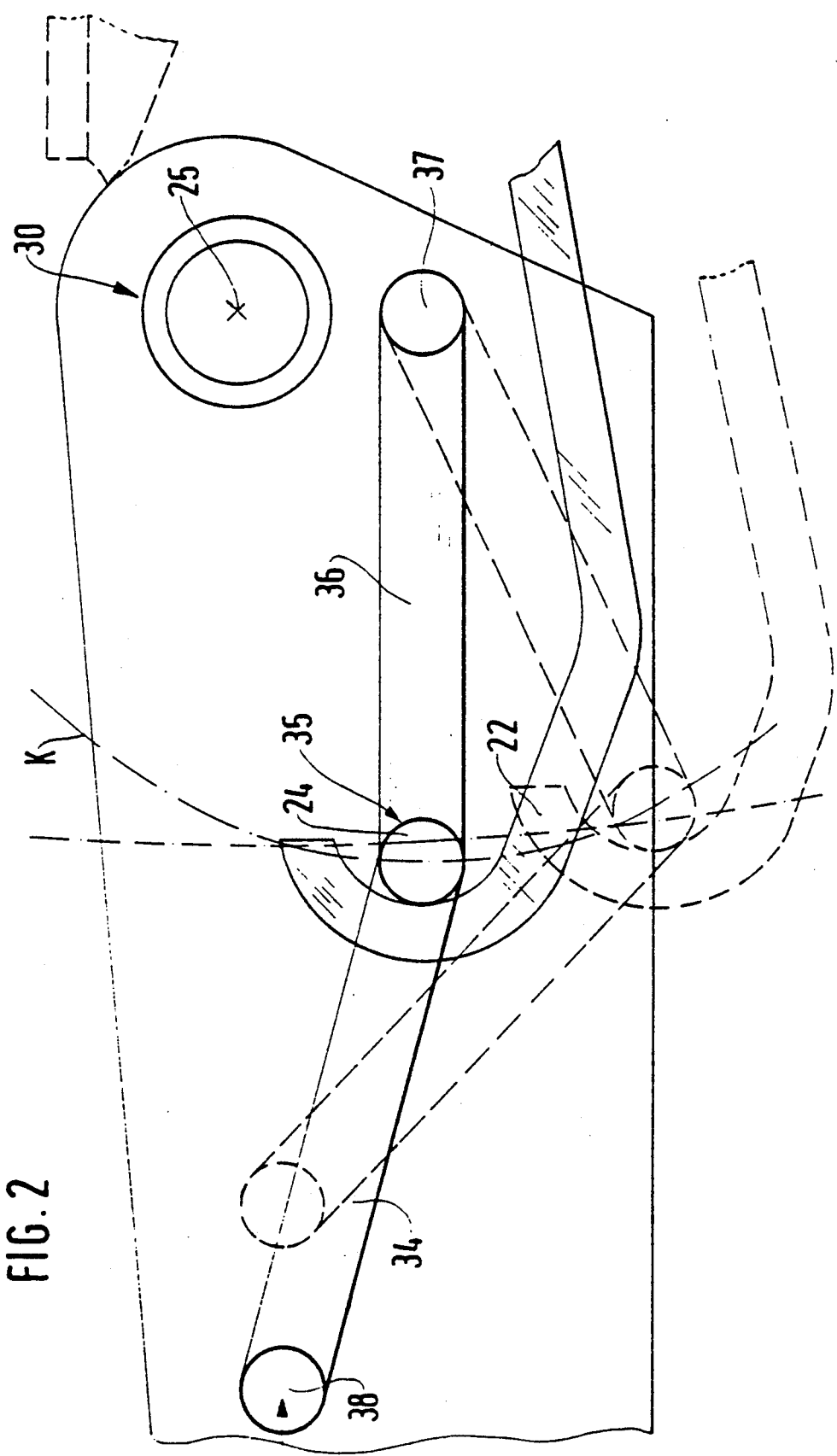
FIG. 2 is a view showing a unit for changing an abutment force of a wiper arm of the wiping device in accordance with the present invention.

FIG. 2 shows a unit for changing the abutment force of the wiper arm. The unit includes two hinge parts 34 and 36 which are hingedly connected with one another in a coupling point 35 by means of an axle 24. The other end of the hinge rod 36 is supported on a frame-fixed axle 37. The other end of the hinge rod 34 is connected with an actuating unit 40. By means of the actuating unit 40 the hinge rod 34 can be displaced horizontally and particularly in direction toward the axle 25 substantially at its height. As can be seen from FIG. 1, the ear member 22 of the left spring end surrounds the axle 24.

In the position shown in FIG. 2, the pulling spring 20 has a predetermined pretensioning with which it presses a wiping blade against the window of the power vehicle. If the pressing force increases, then by the unit 40 the axle 38 of the hinge rod 34 is displaced in direction toward the axle 25. Thereby the coupling point of both hinge rods or the axle 24 describes a curve along a arc K, which defines a concave surface facing the spring and a convex surface the wiper shaft, and so that the coupling point moves downwardly. At the end of this movement the axle 24 reaches a point which is located further from the mounting point 14 of the other spring end then it was before. Thereby the pretensioning of the pulling spring is increased.

The actuating unit 40 for the coupling rod 34 is a linear drive, such as for example an electric motor with a spindle and a spindle nut, a hydraulic cylinder-piston unit, or a pneumatic cylinder-piston unit. In this manner relatively great changes in the abutment force are performed with small adjustment movements. The geometry of the wiper arm and the adjusting mechanism for the abutment force can be determined relative to one another so that no spring elongation occurs. Such a construction of the device is very compact.

It will be understood that each of the elements described above, or two or more together, may also find a useful application in other types of constructions differing from the types described above.

While the invention has been illustrated and described as embodied in a wiping device for windows of power vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A wiping device for windows of a power vehicle, comprising a wiper shaft; a wiper arm including one part of said wiper arm mounted on said wiper shaft and another part of said wiper arm hingedly connected with said one part of said wiper arm on an axle of said wiper arm; a wiping element arranged on a free end of the other part of said wiper arm; and a unit for changing an abutment force of said wiper arm and including a pulling spring loading said wiping element toward a window of a power vehicle, and means for changing a pretensioning of said pulling spring, said means consisting of an actuating unit, a first hinge rod having one end directly hingedly connected with said actuating unit and another end, a second hinge rod having one end and another end, a first axle on which said hinge rods are hingedly connected with one another by said another ends, a second fixed axle about which said one end of said second hinge rod is turnable, said actuating unit displacing said first hinge rod in direction toward said second fixed axle of said second hinge rod so that said hinge rods are freely movable together and said first axle is movable over an arc, wherein said arc defines a concave surface facing the spring and convex surface facing the wiper shaft said second fixed axle being located substantially under said axle of said wiper arm, said another part of said wiper arm extending in one direction from said axle of said wiper arm, while said hinge rods extend in an opposite direction with respect to said one direction of said another part of said wiper arm, said pulling spring having an end which is spaced from said wiping element and suspended on said first axle.

2. A wiping device as defined in claim 1 wherein said means includes a linear drive for producing a displacement force for said hinge rods.

* * * * *